April 7, 1964 F. T. BOESCH ETAL 3,128,349

MULTIFREQUENCY SIGNAL RECEIVER

Filed Aug. 22, 1960 4 Sheets-Sheet 1

INVENTORS F. T. BOESCH
D. H. NASH
L. SCHENKER

BY E. J. [signature]

ATTORNEY

April 7, 1964 F. T. BOESCH ETAL 3,128,349

MULTIFREQUENCY SIGNAL RECEIVER

Filed Aug. 22, 1960 4 Sheets-Sheet 2

INVENTORS F. T. BOESCH
D. H. NASH
L. SCHENKER
BY E J Olinder
ATTORNEY

MULTIFREQUENCY SIGNAL RECEIVER

Filed Aug. 22, 1960 4 Sheets-Sheet 3

INVENTORS F. T. BOESCH
D. H. NASH
L. SCHENKER
BY [signature]
ATTORNEY

INVENTORS F. T. BOESCH
D. H. NASH
L. SCHENKER
BY E. J. Snider
ATTORNEY

United States Patent Office
3,128,349
Patented Apr. 7, 1964

3,128,349

MULTIFREQUENCY SIGNAL RECEIVER

Francis T. Boesch, Brooklyn, N.Y., and Donald H. Nash and Leo Schenker, Berkeley Heights, N.J., assignors to Bell Telephone Laboratories, Incorporated, New York, N.Y., a corporation of New York Filed Aug. 22, 1960, Ser. No. 50,916
13 Claims. (Cl. 179—84)

This invention relates to multifrequency signaling systems and more particularly to multifrequency signal receivers and its general object is to increase the reliability of such receivers.

One illustrative multifrequency signaling system employs signals generated in accordance with the so-called 4×4 multifrequency code. Such signals may be generated by a pushbutton telephone subset, for example. The coded signal comprises selected combinations of coincident two-tone bursts, and each combination comprises one tone from a relatively high-frequency band and one from a relatively low-frequency band. Multifrequency coded signals of the type indicated are more fully described in the January 1960 issue of the Bell System Technical Journal, 39 B.S.T.J. 235.

In a telephone system employing such signaling, the central office equipment includes a receiver which converts each tone pair into D.-C. signals and appropriate combinations of these D.-C. signals are used conventionally to initiate the operation of the central office switching equipment. A receiver of this general type is shown, for example, in U.S. Patent 3,076,059, issued to L. A. Meachum and L. Schenker, January 29, 1963.

A continuing problem in receiving equipment of the type indicated is the generation of apparently valid output signals in response to spurious input signals which may, for example, comprise speech or noise. Although a variety of combinations of signal validity tests have been applied in signal receivers in the prior art, the circuitry employed is unduly complex and the results not fully satisfactory. A specific object of the invention, therefore, is to avoid actuating a multifrequency signal receiver by spurious input signals. A further object of the invention is to subject incoming signals in a multifrequency signal receiver to a combination of validity tests without resort to complex circuitry.

These and other objects of the invention are achieved by the employment of a signal coincidence-duration test circuit which, in combination with tuned circuits and controlling logic circuitry, imposes a validity check on incoming signals to the extent that signals, in order to be recognized as valid, must not only fall within preselected frequency bands but must also be coincident in time over a period of preselected duration. The frequency validity of each component of an incoming signal is checked by examining the voltage across the tuned circuits. This check is hereinafter referred to as the "detecting function." The duration-validity tests are performed on D.-C. pulses derived in the performance of the detecting function. Upon the termination of both validity tests, namely frequency and duration of coincidence, the input tones may no longer be present and, in the absence of a storage or memory function, the frequency identity of the tones may be lost. In accordance with the principles of the invention, storage of the identity of incoming tones is provided for by combining the detecting and output functions of the receiver. More specifically, the detector stage and the output stage for each frequency channel which may, for example, comprise a first and a second respective transistor, are interconnected to form a plurality of bistable flip-flops. The flip-flop in an active channel changes to the "output" state provided that two conditions are met. First, there must be an input from a corresponding one of the selective tuned circuits and second, there must be power available to the emitter of the output transistor. Power to the emitters of all of the output transistors is made available by an enabling circuit which, in turn, is made operative by the output from a timer in the coincidence-test circuit. Once the flip-flop has changed to the output state, however, the condition persists as long as the timed output of the enabler is present and the identity of the operative channel is thereby retained, irrespective of whether the input signal is terminated during the timed output interval.

In accordance with another aspect of the invention, operation of all of the detectors, except the one active detector in each of the two frequency bands, is inhibited for the duration of each output signal, thereby affording additional protection against spurious inputs. The inhibiting function in one embodiment of the invention is provided by an inhibit circuit which, in response to an output from the enabler, raises the emitter bias of the detector transistors to a level which inhibits all except the two which derive their base currents from their output mates.

In accordance with another aspect of the invention, the continued detection of a signal, following the termination of the timed output interval, is prevented from resulting in a repetition of the output signal. This safeguard is provided by the duration-coincidence test circuit which cannot be reset to initiate a second signal until the termination of a first signal.

Accordingly, one feature of the invention is the provision in a multifrequency signal receiver of means for combining the output and detecting functions of the receiver with a storage function which preserves the frequency identity of incoming signals for a preselected period after the termination of the validity checks, irrespective of the subsequent termination time of such signals.

Another feature of the invention is a means for inhibiting each of the channel detectors, except the two active detectors, for a preselected period following the output from a duration-coincidence test circuit.

A further feature of the invention is the dual employment of the output of a signal-validity test circuit for enabling all of the output gates and for inhibiting only the inactive detectors in a multifrequency signal receiver.

The principles of the invention and additional objects and features thereof will be fully apprehended from the following detailed description of an illustrative embodiment and from the appended drawings in which:

FIG. 1 is a block diagram of a multifrequency signal receiver in accordance with the invention;

FIGS. 2 and 3, taken together, present a schematic circuit diagram of the receiver shown in FIG. 1;

Figure 1:
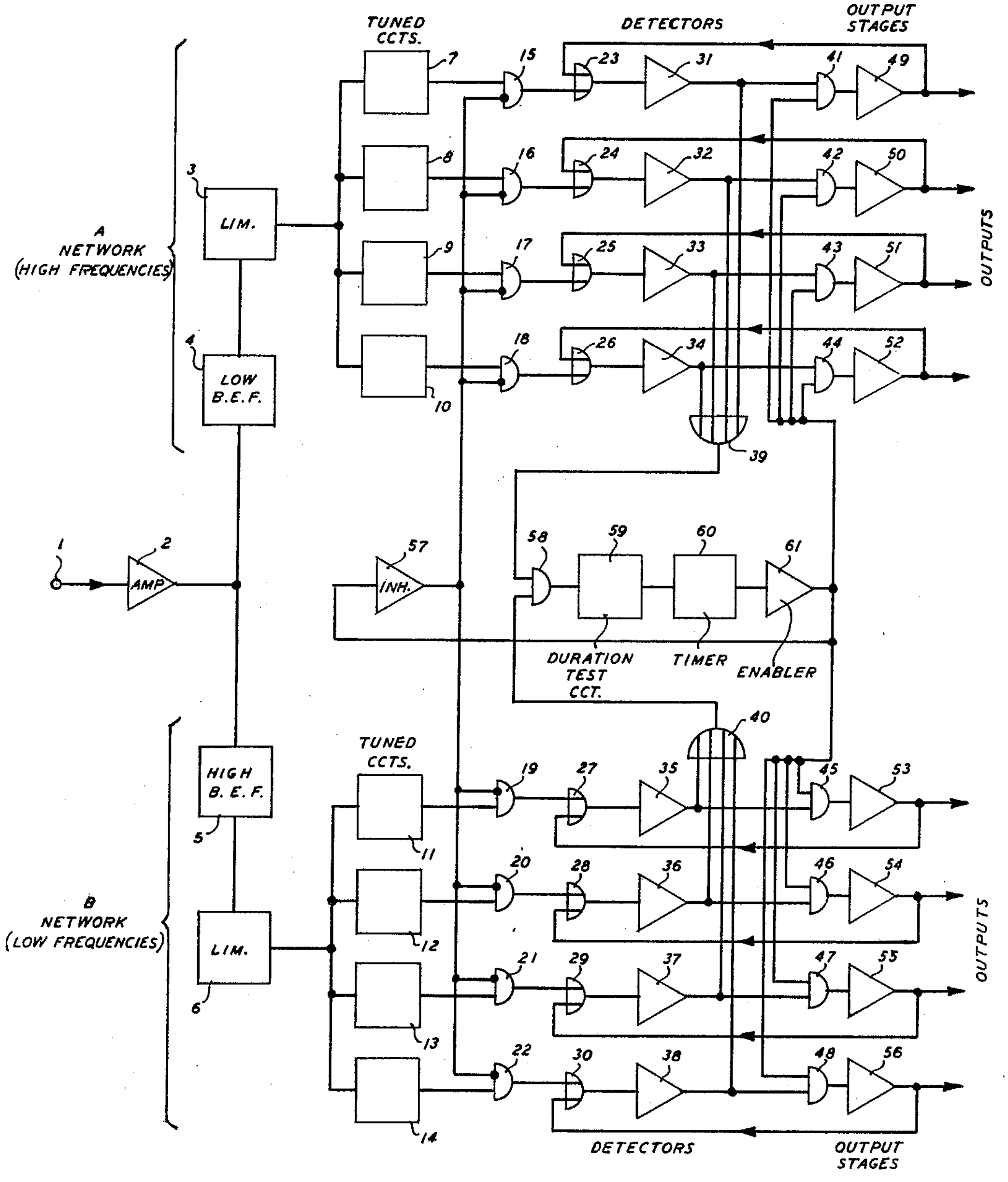

The receiver shown in FIG. 1 includes an input or buffer amplifier 2 whose output is applied to each of two band-elimination filters 4 and 5. Filter 4 eliminates the relatively low or B-band of frequencies and filter 5 eliminates the relatively high or A-band of frequencies. Outputs from the filters 4 and 5 must be of sufficient magnitude to overcome the threshold level of the limiters 3 and 6, respectively. The function of the limiters 3 and 6 is to convert the tone burst input signals into a symmetrical square-wave output at the tone frequency. The selective or tuned circuits 7 through 10 in the A-band and 11 through 14 in the B-band are series-tuned circuits and each is resonant at a corresponding one of the input-tone frequencies. The receiver as described thus far is substantially conventional.

In the A network each of the tuned circuits 7 through 10 is followed by a respective one of the logic gates 15 through 18. Corresponding units in the B network are gates 19 through 22. In the absence of an inhibiting signal from the inhibitor 57, each of the gates 15 through 22 may pass a signal from its corresponding tuned circuit to a respective one of the detectors 31 through 38 by way of a respective one of the OR gates 23 through 30. Accordingly, in logic circuitry parlance, each of the gates 15 through 22 performs an AND NOT function. Each of the channels in the two networks additionally includes a respective one of the OR gates 39 and 40, and a respective one of the output stages, each comprising one of the AND gates 41 through 48 and one of the amplifiers 49 through 56. The remainder of the receiver comprises units which are common to both the A and B networks, namely, AND gate 58, the duration test circuit 59, the output timer 60, the enabling circuit 61 and the inhibit amplifier 57. The specific function and operation of the receiver together with the cooperative relation among the various circuit combinations may best be described by tracing the path of an illustrative signal.

Assume first that an input signal comprising two tones has been applied to the input point 1. Each of the two tones is amplified by the common input amplifier 2. The high-frequency tone is blocked by the band-elimination filter 5 and the low-frequency tone is blocked by the band-elimination filter 4. Limiter 3 converts the high-frequency or A-tone to a square wave of like frequency and a similar function is performed by limiter 6 on the B-tone. The outputs from the limiters each result in an output from a respective pair of the tuned circuits 7 through 14, each circuit of the pair being resonant at a respective one of the input tone frequencies. For example, tuned circuits 7 and 11 may produce outputs and each output is in turn passed by a respective one of the AND NOT gates 15 and 19 and by a respective one of the OR gates 23 and 27 as an input to a respective one of the detectors 31 and 35. The detectors are appropriately biased to create a threshold or level which must be overcome by an input signal before such a signal can be conditionally considered as valid. Having met the threshold test of the detectors 31 and 35 the two signals are applied by way of a respective one of the OR gates 39 and 40 to AND gate 58. Coincidence of the signals is required at this point before a signal can be applied to the duration test circuit 59. In turn, the duration test circuit 59 initiates operation of the output timer 60 only in the event that the coincidence between the two signals persists for a preselected period, such as 30 milliseconds, for example.

If the coincidence-duration test is satisfied, all required tests have been passed, the input signals are accepted as valid, and the output phase of the receiver operation is initiated.

In response to an output from the duration test circuit 59, the output timer 60 generates a timed pulse with a duration which fixes the duration of the final output signal. The problem at this point in the operation is to apply a signal from the timer 60 to one of the output gates 49 through 52 and to one of the output gates 53 through 56, for an output signal is desired from only those output gates whose corresponding detectors have been operated. During the time that the coincidence-duration test is made, information as to the identity of the frequencies of the incoming signal tones is available in the tuned circuits. It cannot be presumed, however, that the information in the tuned circuits will necessarily remain stored for any appreciable time after the termination of the input signals. Consequently, if the input signals terminate before the signal from the output timer 60 can be applied to the proper pair of output gates 49 through 56 there is no way, at that point in time, to determine which particular pair of output gates should be employed.

The problem outlined above is met in accordance with the invention by applying the output signal from the timer to an enabler circuit 61. The enabler 61, in turn, enables each of the AND gates 41 through 48 and keeps them in the enabled condition for the duration of the signal from the output timer 60. In one specific embodiment of the invention a timer output duration of 50 milliseconds was employed. Although each of the AND gates 41 through 48 is enabled, only those two gates whose detectors are On can register outputs. Consequently, in the instant case, AND gates 41 and 45 operate thereby effecting the operation of the output amplifier stages 49 and 53, respectively. To ensure the operation of the output stages 49 and 53 for the full duration of the signal from the output timer 60, irrespective of the termination of oscillations in tuned circuits 7 and 11, a portion of the output signal is fed back to the input of the corresponding detector. Accordingly, in the present illustration, a feedback signal in the A network is applied to the input of a detector such as 31 by way of an OR gate such as 23. Similarly, in the B network a feedback signal is applied to a detector such as 35 by way of an OR gate such as 27. As a result, two output gates such as 49 and 53 remain in the On condition for the full duration of the signal from the output timer 60.

From the block diagram of a receiver in accordance with the invention as shown in FIG. 1, it would appear that a two-tone input signal with a duration which exceeds the duration measured by the output timer 60 could cause a second output from one of the output amplifiers 49 through 56 at the expiration of the enablement period. Such action is prevented, however, by a feature of the invention which prevents resetting the duration test circuit 59, and hence the output timer 60, until one of the detectors 31 through 38 has been reset. The specific means employed to prevent such resetting is not shown in FIG. 1 but is discussed below herein in connection with the description of FIGS. 2 and 3.

One additional feature is employed in accordance with the invention to increase the protection against false operation of the receiver by spurious signals. As pointed out above, all eight of the AND gates 41 through 48 are enabled during the enablement period. In the event that incoming signal tones are very brief, just sufficient for recognition, for example, it is possible that the tones may be followed by spurious signals comprising speech or noise having frequency components which correspond to the resonant frequency of one or more of the tuned circuits 7 through 14. This possibility raises an attendant danger that one or more of the tuned circuits may respond to a spurious signal and produce an output at one or more output stages in addition to the pair which has been activated by the bona fide signal. Such a sequence of operations is prevented, in accordance with the invention, by inhibiting the transmission of information from the tuned circuits 7 through 14 to the detectors 31 through 38 during the enablement period. More specifically, a part of the output from the enabler 61 is fed back through the inhibit amplifier 57 and applied to each of the AND NOT gates 15 through 22. So long as this condition persists, a detector such as 31 or 35 is in effect isolated from the direct application of incoming signals and may be kept operated only by means of feedback from its corresponding output amplifier.

Figures 2, 4:
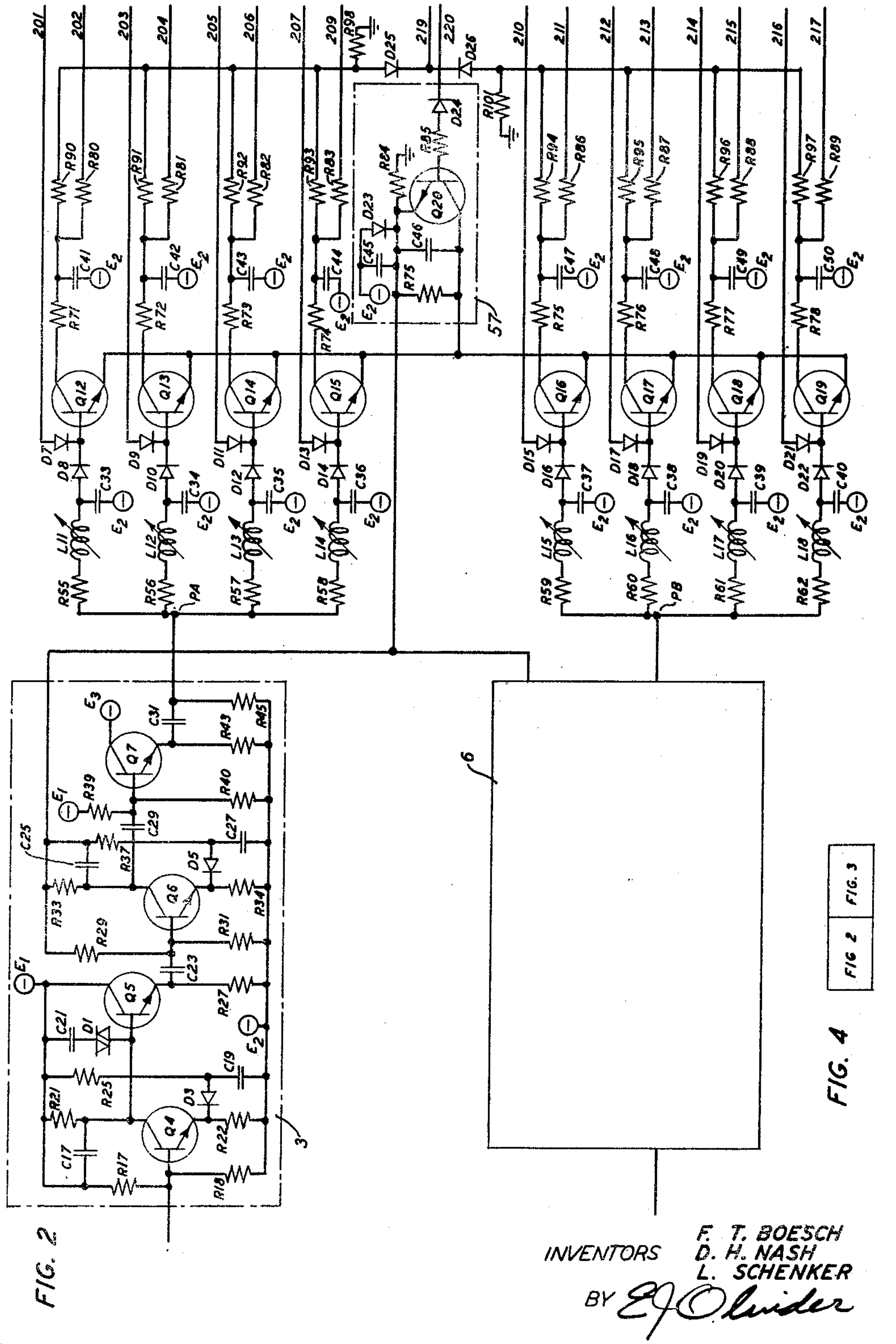
FIG. 4 is a block diagram of the relation between FIGS. 2 and 3.
Figure 3:
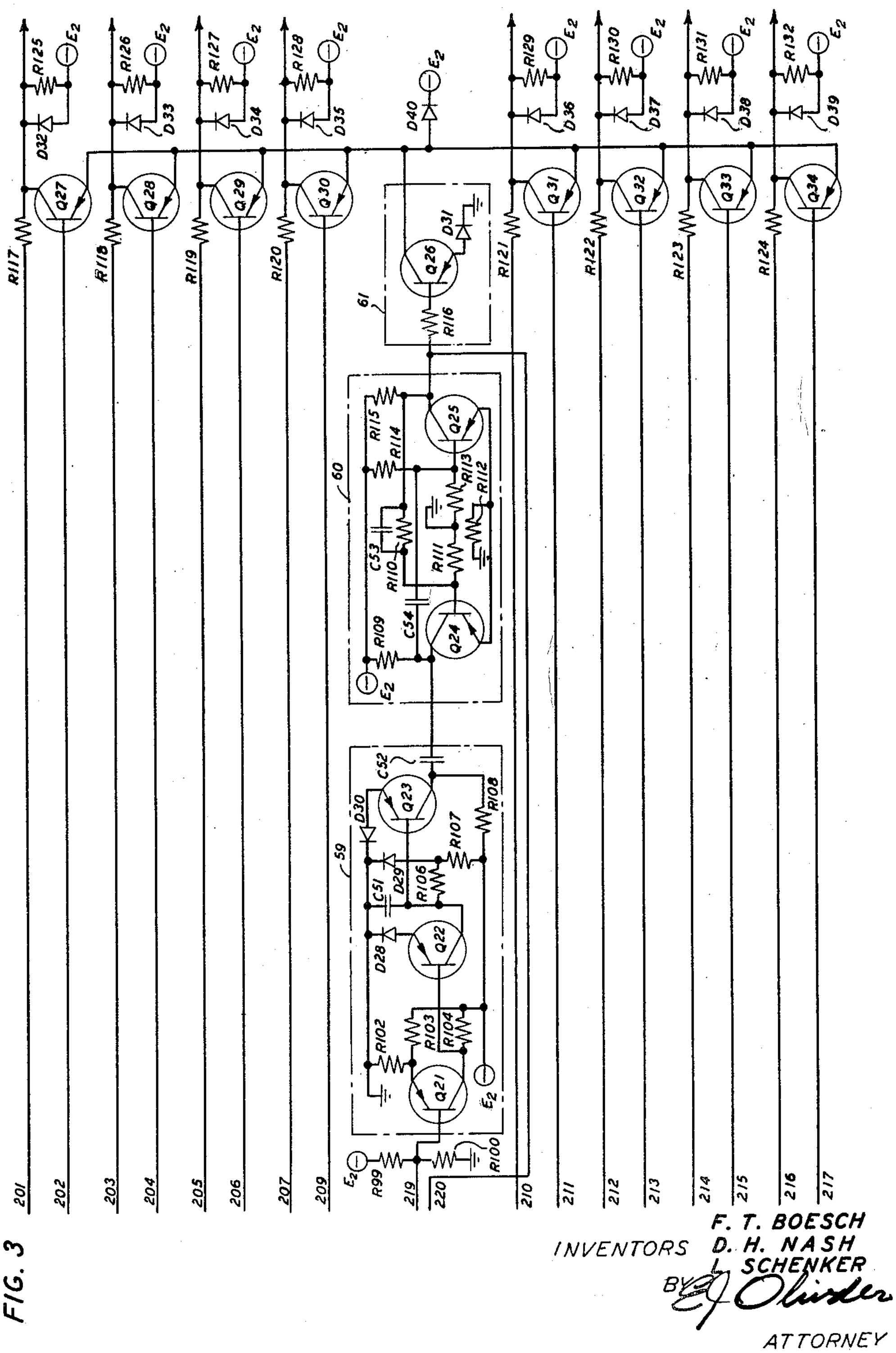

FIGS. 2 and 3 together present a detailed schematic circuit diagram of a part of the receiver shown in block form in FIG. 1. The buffer amplifier 2 and the band-elimination filters 5 and 6, shown in FIG. 1, have been omitted from FIG. 2 inasmuch as any one of a number of combinations of amplifiers and filters known in the prior art may be employed. The circuit details of the B network limiter 6 of FIG. 1, identical to the A network limiter 3, have also been omitted. Major blocks or units of equipment in FIGS. 2 and 3 bear designating numerals and characters which are the same as those employed for corresponding units in FIG. 1.

Limiter 3 includes four stages comprising respectively transistors Q4, Q5, Q6, and Q7 and associated circuit elements. The first and third stages, transistors Q4 and Q6, are grounded-emitter limiting amplifiers and their primary function is to produce an output square wave of fixed amplitude which is substantially symmetrical and uniform over a relatively wide range of input amplitudes and frequencies. Transistors Q5 and Q7 are emitter-follower stages which provide, respectively, a low driving point impedance and a low output impedance for transistor Q6.

Bias for the first limiting stage is supplied by the negative D.-C. sources $E_1$ and $E_2$ in combination with resistors R17, R18, R21, R22 and R25. Additional circuit elements which contribute to the operation of the first stage include diode D3 and capacitor C19, which stabilize the voltage on the emitter of transistor Q4, and capacitor C17 which limits the gain at high frequencies and thereby prevents unwanted oscillations from building up. In performing its function as a limiter, transistor Q4 behaves substantially like an On-Off switch with its state of operation being dependent on the polarity of the input signal. The collector output of transistor Q4, which is limited further by the two-way diode D1, is applied to the base of the second stage transistor Q5.

The collector of transistor Q5 is biased directly by the D.-C. source $E_1$ and emitter bias is supplied from the D.-C. source $E_2$ by way of resistor R27. As noted above, the primary function of transistor Q5 is to provide a low driving point impedance for the second limiting stage, transistor Q6. The emitter output of transistor Q5 is applied to the base of transistor Q6 by way of the coupling capacitor C23.

The general operation of transistor Q6 as a limiter and the functions of the associated circuit elements are substantially identical to those described above for the first limiting stage, transistor Q4. One exception to this similarity is that in the second stage additional diode limiting is not provided and a second exception lies in the biasing arrangement provided for transistor Q6. Specifically, bias for the base and collector of transistor Q6 is provided in part by the voltage drop across the Zener diode D23 in the inhibitor circuit 57 by way of resistors R29 and R33. At this point it is of significance to note that the voltage drop across diode D23 is also used to bias the emitter of each of the detector transistors Q12 through Q19 which in turn establishes the threshold of the detectors. By employing the same voltage to control the amplitude of the output of the limiters 3 and 4 and to fix the threshold of the detector transistors Q12 through Q19, the ratio of limiter output voltage to detector recognition voltage is held relatively constant and is substantially independent of temperature or supply voltage. As a result, the recognition bandwidth associated with the tuned circuits remains relatively fixed irrespective of changes in the recognition threshold of the detector transistors Q12 through Q19.

The output from the collector of transistor Q6 is coupled to the base of transistor Q7 by way of capacitor C29. Bias for the base of transistor Q7 is provided by the D.-C. sources $E_1$ and $E_2$ acting across resistors R39 and R40. Resistor R43 biases the emitter of transistor Q7 and the collector is biased by the source $E_3$. The final output of limiter 3 is taken from the emitter of transistor Q7 and is applied to the common point PA of the A network tuned circuits by way of capacitor C31. A corresponding output from limiter 6 of the B network is applied to the common point PB of the B network tuned circuits.

Each of the eight tuned circuits comprises a resistor from the group R55 through R62, an inductor from the group L11 through L18 and a capacitor from the group C33 through C40, and each is tuned to resonance at a respective one of the signaling frequencies. Each of the OR gates 23 through 30 of FIG. 1 comprises a respective one of the diode pairs D7, D8 through D21, D22 and each of the detectors 31 through 38 of FIG. 1 comprises a respective one of the transistors Q12 through Q19.

As indicated above, the threshold of the detectors is established by biasing the emitters of the detector transistors from the D.-C. source $E_2$, reduced by the voltage drop across diode D23 of the inhibit circuit. Transistor Q20 of the inhibit circuit is normally biased On which provides a relatively low resistance D.-C. path from the cathode of diode D23 to the emitter of each of the detector transistors Q12 through Q19.

Operation of a detector circuit, such as the circuit in the A network which comprises transistor Q12, is initiated by a signal from its corresponding tuned circuit whenever the positive peaks of the A.-C. voltage across capacitor C33, reduced by the voltage drop across diode D8 and the base-emitter junction of transistor Q12, exceeds the threshold or designed voltage-recognition level of the detector. Diode D8 conducts, transistor Q12 turns On in spurts and the resulting voltage change at the collector charges capacitor C41. The rectifying action of transistor Q12 and the filtering action of capacitor C41 thus transforms the A.-C. signal across capacitor C33 to a D.-C. signal across capacitor C41. In the instance of a bona fide input signal which comprises a tone in each of the two frequency bands, a detector in the group which includes transistors Q16 through Q19 is also operated which in turn charges a corresponding one of the collector circuit capacitors C47 through C50. After each charging cycle, capacitor C41 discharges toward ground potential by way of a path which includes resistors R90 and R98. Similarly, a discharge path to ground is provided in the B network for each of the capacitors C47 through C50 which path includes a respective one of the resistors R94 through R97 and the common resistor R101.

The D.C. output of each operating detector is applied to a corresponding one of the output stages shown in FIG. 3 by a respective one of the resistors R80 through R83 and R86 through R89 over a corresponding one of the connecting leads 202, 204, 206, 209, 211, 213, 215, and 217. As shown in FIG. 1, the output of each of the detectors 31 through 34 in the A network is also applied to OR gate 39. Similarly, the output of each of the detectors in the B network is applied to OR gate 40. The output from each of the OR gates 39 and 40 is in turn applied to an AND gate 58. In FIG. 2, OR gate 39 comprises the combination of resistors R90 through R93 and resistor R98. Similarly, the B network OR gate 40 comprises the combination of resistors R94 through R97, resistor 101. The coincidence-test AND gate 58 of FIG. 1 comprises diodes D25 and D26 in FIG. 2. These diodes are suitably poled so that coincident signals from a detector in the A network and from a detector in the B network place both diodes in the Off or non-conducting condition. Whenever this condition exists, it is an indication that the coincidence test has been met and the test for a preselected duration of coincidence is initiated.

The coincidence-duration test circuit 59, shown in FIG. 3, comprises transistors Q21, Q22, Q23 and their associated circuit elements and its purpose is to develop an output signal whenever diodes D25 and D26 are both Off for a preassigned period of time. When either or both of the diodes D25 and D26 are conducting, the potential on the base of transistor Q21 is held sufficiently positive with respect to its emitter to hold transistor Q21 in the Off condition. When both diodes D25 and D26 are Off, however, bias on the base of transistor Q21 is made negative with respect to the emitter by virtue of a biasing potential which is determined solely by the combination of the D.-C. source $E_2$, resistor R99 and resistor R100. Consequently, transistor Q21 turns On.

Bias potential on the emitter of transistor Q21 is fixed by the bias circuit which includes the D.-C. source $E_2$ and resistors R102 and R103. Collector bias on transistor Q21 is fixed by diode D28 conducting current through the base-emitter junction of transistor Q22 and through resistor R104 to the D.-C. source $E_2$.

In the normal or quiescent condition of operation when transistor Q21 is Off, transistor Q22 is On. Circuit elements which establish this condition by suitably biasing transistor Q22 include resistors R104, R105, R107 and diodes D28 and D29. When transistor Q21 conducts, however, the potential on its collector, and hence the potential on the base of transistor Q22, is changed to a value sufficiently less negative than its emitter to turn transistor Q22 Off. The potential on the collector of transistor Q22 rises in the negative direction toward a value determined by resistors R106, R107, diode D29 and the negative D.-C. source $E_2$. The nature and duration of this rise is determined primarily by the time constant of capacitor C51 and resistor R106. If input signal coincidence persists for a sufficiently long period, in one embodiment 30 milliseconds was selected, the charge on capacitor C51 becomes sufficiently negative so that the base of transistor Q23 becomes negative with respect to its emitter and transistor Q23 turns On. Emitter and collector bias potentials on transistor Q23 are fixed by diode D30 and by resistor R108, respectively. When transistor Q23 turns On, it is an indication that all signal validity tests have been made and that the signal input tone pair has been accepted as bona fide. At this point the generation of a timed output signal and the application of that signal to the proper pair of output terminals are the only operations to be completed.

The output timer circuit 60 is a monostable multivibrator comprising transistors Q24 and Q25. In the quiescent condition transistor Q24 is biased Off and transistor Q25 On. When transistor Q23 turns On, the resulting voltage rise on its collector is applied to the base of transistor Q25 by way of capacitors C52 and C54, turning transistor Q25 Off. The resulting voltage drop on the collector of transistor Q25 is coupled to the base of transistor Q24 by capacitor C53, turning transistor Q24 On. The accompanying voltage rise at the collector of transistor Q24 reinforces the original voltage rise that caused transistor Q25 to be turned Off. With transistor Q25 Off, capacitor C54 discharges in accordance with the time constant fixed by its own capacitance and the resistance of resistor R114.

At a point in time when the voltage across capacitor C54 is still changing at a relatively rapid rate, the potential on the base of transistor Q25 is driven sufficiently negative with respect to its emitter to switch it back to the On condition. The total Off period of transistor Q25 fixes the duration of the output signal on its collector. In one embodiment of the invention this period was selected to be on the order of 50 milliseconds.

During the Off period of transistor Q25, the reduced potential on its collector lowers the base potential of transistor Q26 with respect to its emitter and turns transistor Q26 On. The resulting potential on the collector of transistor Q26 is sufficiently more positive than that established by the D.-C. source $E_2$ and diode D40 on the emitters of the output transistors Q27 through Q34, that any output transistor with a proper signal on its base is turned On. If, for example, an output signal is present on the base of both transistors Q27 and Q31, an output signal on the collector of each results. These two signals may then be employed to initiate the operation of conventional central office switching equipment, not shown. For the receiver illustrated in FIGS. 2 and 3 it is assumed that a respective relay is operated by an output from each of the output transistors Q27 through Q34. In each case a combination of a respective one of the diodes D32 through D40 and a respective one of the resistors R125 through R132 is employed as a damping circuit to protect its corresponding output transistor from the inductive current surges caused by the output relay, not shown.

In accordance with the invention an additional function is performed by the collector output of the output transistors. The collector of each of the output transistors Q27 through Q34 is connected to the base of its detector transistor mate by a path which includes a respective one of the resistors R117 through R124 and a respective one of the diodes D7 through D22. In effect, each detector and output transistor combination comprises a multivibrator circuit with collector-to-base cross connections arranged so that both transistors are either On or Off, and the common state at any particular time is established by the presence or absence of a valid output signal. Accordingly, the two actuated detector transistors Q12 and Q16, for example, are locked On by positive feedback so long as the enabler transistor Q26 remains On. Further, the final output signals persist for the duration of the output from the output timer 60 irrespective of whether the outputs from the corresponding tuned circuits terminate at some earlier point in time.

In the discussion above, the employment of the output of the timer 60 as a standard for the duration of the final output signal is described. In accordance with the invention, the output of the timer 60 also performs an auxiliary function, namely, that of initiating the operation of the inhibit circuit 57.

When transistor Q25 is turned Off, the resulting voltage change on its collector is applied to the base of transistor Q20 by way of lead 220, diode D24 and resistor R85, turning transistor Q20 Off. With transistor Q20 Off, the relatively low-resistance, D.-C. path from the source $E_2$ to the emitters of the detector transistors is opened and capacitor C46 is charged by the emitter current from the two transistors Q12 and Q16 which have been locked On. The accompanying increase in voltage on the emitters of the detector transistors Q12 through Q19 is sufficient to inhibit their operation by an output from any of the tuned circuits. The increase in detector threshold is insufficient, however, to turn Off the On transistors Q12 and Q16. Consequently, the system is fully protected from any spurious input signals which may be received during the output period of the timer 60.

Figure 5:
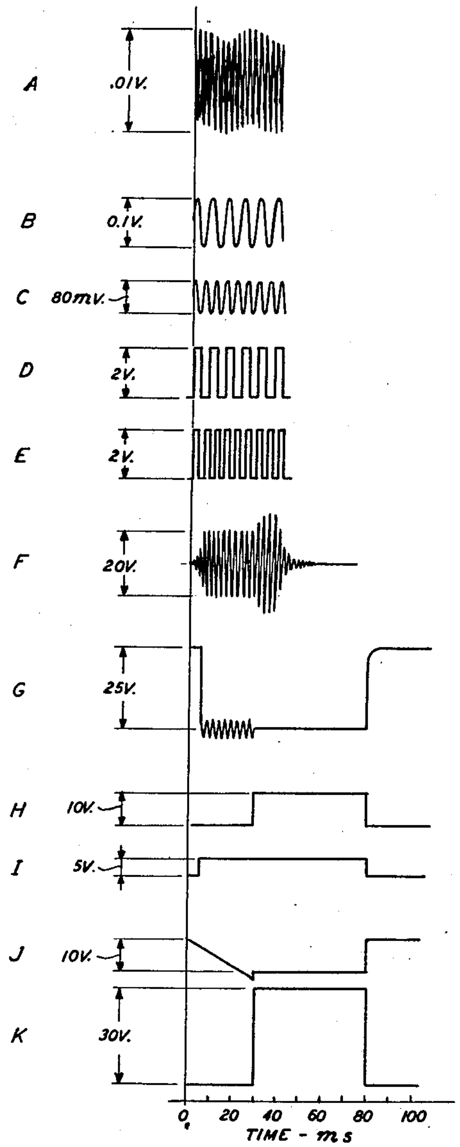
FIG. 5 is a plot of illustrative wave forms from the circuit shown in FIGS. 2 and 3.

The complete operation of the receiver shown in FIGS. 2 and 3 may be conveniently summarized in terms of the wave forms generated in the circuit at specific points of interest in response to a bona fide input signal. Illustrative wave forms are shown in FIG. 5. Although the wave forms are drawn on a common time scale, varying scales are employed on the voltage axis and specific voltages are as indicated. Wave form A is a bona fide input signal comprising two coincident tones of approximately 900 cycles and 1200 cycles, respectively. Wave forms B and C are the two tones after their separation by the filter circuits 4 and 5 shown in FIG. 1. The voltage amplitude of the two waves is 0.1 volt and 80 millivolts, respectively. These waves have been expanded on the time scale in order to illustrate their chanctistics more clearly. The corresponding outputs of the limiters 3 and 6, similarly expanded, are shown as wave forms D and E. Each of the limiter outputs is a square wave having the same fundamental frequency as its sine wave input. The amplitudes of the limiter outputs are the same, however, provided that the input signals exceed the limiter threshold. A typical limiter output may be on the order of two volts, peak-to-peak.

Wave forms F through K are from a single network, the A network, for example, inasmuch as the wave forms at corresponding network points beyond the tuned circuit stages are identical. A typical tuned circuit output is illustrated by wave form F. Average peak-to-peak voltage is approximately 20 volts and its duration is substantially that of the input signal, that is, 40 milliseconds.

The next wave form of interest is the detector output which is taken from the collector of a detector transistor such as Q12. Wave form G, a negative D.-C. pulse of approximately 25 volts with a partially superimposed sawtooth wave is a typical detector output signal. The sawtooth part of wave form G is terminated at the beginning of wave form H which is the inhibit signal from the inhibitor 59 which raises the threshold of the detectors to a point above the output level of the tuned circuit.

The output of the coincidence circuit, the signal on the collector of transistor Q21, is shown by wave form I and the duration test circuit output, the voltage change across capacitor C51, is shown by wave form J. Typical magnitudes of these signals are 5 and 10 volts, respectively.

A final output pulse, having an amplitude of 30 volts and a duration of 50 milliseconds, is shown by wave form K.

It is to be understood that the above-described arrangements are illustrative of the principles of this invention. Numerous other arrangements may be designed by persons skilled in the art without departing from the spirit and scope of the invention.

What is claimed is:

1. A signal receiver for receiving pairs of oscillatory input signals, means for separating each of said signal pairs into a first signal in a first frequency band and a second signal in a second frequency band, first means for testing the validity of each of said first signals in terms of correspondence with any one of a first preselected number of frequencies within said first frequency band, second means for testing the validity of each of said second signals in terms of correspondence with any one of a second preselected number of frequencies within said second frequency band, third means responsive to said first means for testing the validity of each of said first signals in terms of amplitude, fourth means responsive to said second means for testing the validity of each of said second signals in terms of amplitude, fifth means jointly responsive to said third and fourth means for testing the validity of each of said pairs of input signals in terms of the duration of coincidence between the signals in each respective one of said pairs, a plurality of pairs of output points, each of said last-named pairs corresponding to the combination of one of said first preselected frequencies and one of said second preselected frequencies in accordance with a preassigned code, means responsive to said fifth means for generating a first D.-C. signal, a plurality of means each jointly responsive to said first D.-C. signal and to a respective one of said third means for generating an output signal and for applying said output signal to a respective pair of said output points thereby identifying the particular frequency combination of the corresponding one of said input signals in accordance with said code, and means for applying a part of said output signal from each of said last-named pair of output points to a corresponding one of said third testing means and to a corresponding one of said fourth testing means, respectively, whereby the duration of each of said output signals is made equal to a preselected duration irrespective of the continuing duration of the corresponding one of said input signals.

2. Apparatus in accordance with claim 1 wherein said second means comprises a plurality of tuned circuits each resonant at a preselected frequency.

3. Apparatus in accordance with claim 1 wherein said third means comprises a plurality of detector circuits each including a respective transistor.

4. Apparatus in accordance with claim 3 wherein said fifth means comprises a transistor multivibrator circuit.

5. Apparatus in accordance with claim 4 wherein said jointly responsive output signal applying means comprises a plurality of output transistors each corresponding to a respective one of said output points and wherein said means for applying a part of said signal to said testing means comprises a feedback path from each of said output transistors to a respective one of said detector transistors.

6. A signal receiver for converting pairs of substantially simultaneous multifrequency input signals into D.-C. output signals comprising, in combination, a first network for input signals within a first preselected band of frequencies; a second network for input signals within a second preselected band of frequencies; each of said networks comprising a respective plurality of signal paths; each of said paths including a respective tuned circuit resonant at a respective preselected frequency, a respective one of a plurality of detector circuits and a respective output point, means responsive to a coincidence of preassigned duration between an output from one of said detectors in each of said networks for generating a triggering signal; means responsive to said triggering signal for generating a timing signal having a preselected duration; means in each of said paths jointly responsive to said timing signal and to a signal from a respective one of said detector circuits for applying an output signal to a corresponding one of said output points; means in each of said signal paths for applying a part of said output signal from a respective one of said output points to the input of a corresponding one of said detectors, whereby, for each of said input signal pairs, a D.-C. output signal having a duration equal to said timing signal, irrespective of the duration of said input signal, is applied to a respective one of said output points in each of said networks.

7. Apparatus in accordance with claim 6 including means responsive to said timing means for inhibiting the transmission of information from each of said tuned circuits to its corresponding detector for the duration of said timing signal, thereby affording additional protection against the generation of output signals in response to spurious input signals.

8. Apparatus in accordance with claim 7 wherein said inhibiting means comprises means for raising the threshold of said detectors.

9. Apparatus in accordance with claim 6 wherein each of said detectors comprises a respective first transistor, wherein each of said output signal applying means comprises a second transistor, means connecting the collector of each of said first transistors to the base of a respective one of said second transistors, and means connecting the collector of each of said second transistors to the base of a respective one of said first transistors.

10. A signal receiver for converting a pair of substantially simultaneous A.-C. input signals of unlike frequency into a pair of D.-C. output signals comprising, in combination; a first and a second network each comprising a respective band-elemination filter, a respective limiter and a respective plurality of signal paths, each of said paths including a tuned circuit resonant at a respective one of a plurality of preselected signal input frequencies, a detector having a preselected threshold of operation, an output gate, and an output point; means responsive to a coincident output from one of said detectors in each of said networks for testing the duration of said coincidence and for generating a triggering signal whenever the duration of said coincidence exceeds a preselected period; means responsive to said triggering signal for generating a timing signal; means responsive to said timing signal for enabling each of said output gates for the duration of said timing signal; means for applying the output of each of said detectors to its corresponding output gate; and means for applying the D.-C. output of each of said gates to a respective one of said output points, the particular pair of said output points to which said D.-C. signals are applied being indicative of the identity of said pair of input signals in terms of frequency in accordance with a preassigned code.

11. Apparatus in accordance with claim 10 including means for maintaining a constant ratio between the amplitude of the output of said limiters and the threshold of said detectors.

12. Apparatus in accordance with claim 10 including means responsive to an output signal at each of said output points for inhibiting the transmission of information between the corresponding one of said tuned circuits and its associated detector.

13. Apparatus in accordance with claim 12 including means responsive to an output signal at any one of said output points for providing an input to a corresponding one of said detectors for the duration of said timing signal, thereby extending the duration of said output signal at said output point to coincide with the duration of said timing signal irrespective of the termination time of said coincident pair of input signals.

References Cited in the file of this patent

UNITED STATES PATENTS

| | | |
|---|---|---|
| 2,131,164 | Chauveau | Sept. 27, 1938 |
| 2,182,119 | Gohorel | Dec. 5, 1939 |
| 2,497,656 | Clarke | Feb. 14, 1950 |
| 2,503,371 | Bachelet | Apr. 11, 1950 |
| 2,577,614 | Fritschi et al. | Dec. 4, 1951 |
| 2,935,572 | Hastings et al. | May 3, 1960 |
| 2,954,545 | Drake | Sept. 27, 1960 |